US006043928A

United States Patent [19]
Walker et al.

[11] Patent Number: 6,043,928
[45] Date of Patent: *Mar. 28, 2000

[54] ROBUST MULTI-WAVELENGTH OPTICAL FIBER COMMUNICATION SYSTEMS

[75] Inventors: Kenneth Lee Walker, New Providence, N.J.; Frederik Willem Willems, Blaricum, Netherlands

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/884,422

[22] Filed: Jun. 27, 1997

[51] Int. Cl.[7] .............................. H01S 3/02; H01S 3/094
[52] U.S. Cl. ...................... 359/337; 359/134; 359/160; 359/341
[58] Field of Search .................................. 359/124, 134, 359/160, 161, 337, 341

[56] References Cited

U.S. PATENT DOCUMENTS

| | | | |
|---|---|---|---|
| 5,392,153 | 2/1995 | Delavaux et al. | 359/341 |
| 5,561,553 | 10/1996 | Marcerou et al. | 359/341 |
| 5,572,357 | 11/1996 | Nakazato et al. | 359/341 |
| 5,721,635 | 2/1998 | Shigematsu et al. | 359/341 |
| 5,764,404 | 6/1998 | Yamane et al. | 359/341 |
| 5,801,878 | 9/1998 | Bourret et al. | 359/341 |
| 5,808,786 | 9/1998 | Shibuya | 359/341 |
| 5,822,113 | 10/1998 | Delavaux et al. | 359/341 |

FOREIGN PATENT DOCUMENTS

| | | |
|---|---|---|
| 6296056 | 10/1994 | Japan . |
| 8095097 | 4/1996 | Japan . |

OTHER PUBLICATIONS

Karasak et al, IEEE Photonics Technology Letters, vol. 10, #7, pp. 1036–1038; abst. only herewith, Jul. 1998.
Goldstein et al, IEEE Photonics Technology Letters, vol. 6, #2, pp. 266–269, abst. only herewith, Feb. 1994.
Delavaux et al, IEEE Photonics Technology Letters, vol. 6, #3, 1994.
Nuyts et al, Optical Fiber Technology, vol. 1,#1, pp. 76–80; abst. only herewith, Oct. 1994.
"Fast Power Transients in Optically Amplified Multiwavelength Optical Networks", by J. L. Zyskind et al., *OFC*, vol. 2, San Jose, California, 1996, Postdeadline Paper PD 31–1.
"Fast Gain Control in an Erbium–Doped Amplifier", by A. K. Srivastava et al., *Technical Digest of the Optical Amplifiers and Their Applications 1996 Topical Meeting, OAA 1996*, postdeadline paper PDP4.
"Dynamic Compensation of Transient Gain Saturation in Erbium–Doped Fiber Amplifiers by Pump Feedback Control", by K. Motoshima et al., *OFC/IOOC Technical Digest*, 1993, pp. 40–42, Paper TuI5.
"Asymmetric Control Laser Cavity Design for Low Noise Operation of an All–Optical Gain Controlled Erbium–Doped Fibre Amplifier", by J. Massicott et al., *Technical Digest, OAA 1996*, paper FB2, pp. 77–80.

*Primary Examiner*—Nelson Moskowitz
*Attorney, Agent, or Firm*—Eugen E. Pacher

[57] ABSTRACT

In an optically amplified multi-wavelength optical fiber communication system, deleterious effects due to channel addition/removal can be reduced or avoided if the optical amplifiers are "overpumped", that is to say, the system is selected such that at least 70%, preferably 90% or more, of the pump power that is introduced into the amplifier fiber is unabsorbed in the amplifier fiber.

9 Claims, 3 Drawing Sheets

ROBUST MULTI-WAVELENGTH OPTICAL FIBER COMMUNICATION SYSTEMS

FIELD OF THE INVENTION

This invention pertains to multi-wavelength optical fiber communication systems that comprise an optical fiber amplifier.

BACKGROUND

Optical fiber amplifiers (exemplarily comprising Er-doped silica-based optical fiber) are well known and play a crucial role in optical fiber communication systems. They are adapted for use in multi-wavelength systems with a multiplicity of signal channels at wavelengths $\lambda_1, \lambda_2, \ldots \lambda_N$. A "channel" herein generally is a wavelength slot in the signal band that carries signal radiation.

In multi-wavelength systems the number of channels may vary, exemplarily due to network re-configuration or channel failure. Thus, the steady state and transient channel addition/removal responses of optical fiber amplifiers are of concern in WDM systems. See, for instance, J. L. Zyskind et al., *OFC '96*, Vol. 2, San Jose, Calif., 1996, Postdeadline Paper PD 31-1. For instance, dropping one or more channels can give rise to error events in the surviving channels because the power in the channels may surpass the thresholds for non-linear effects such as Stimulated Brillouin scattering (SBS). Adding one or more channels to existing channels can depress the power of the existing channels below the receiver sensitivity. Thus, dropping or adding channels in prior art optically amplified multi-wavelength systems can lead to error bursts. Such error bursts are highly undesirable and will frequently be unacceptable to service providers. Consequently, optical fiber amplifiers may not be used in high capacity multi-wavelength optical communication systems unless the channel addition/removal response of the amplifiers can be controlled.

The prior art contains some approaches towards solution of the problem. These include fast automatic output power control which keeps the output power of the surviving channels constant by means of a feedback loop, as well as gain control. See, for instance, A. K. Srivastava et al., *Technical Digest of the Optical Amplifiers and Their Applications* 1996 Topical Meeting, OAA '96, postdeadline paper PDP4; and K. Motoshima et al, *OFC '93*, San Jose, Calif., 1993, pp. 40–42, Paper TuI5, respectively. These approaches are relatively complex and costly. For instance, the latter approach requires an additional laser. Another approach involves optical gain clamping. See, for instance, J. Massicott et al., *Technical Digest, OAA '96*, paper FB2, pp. 77–80. This approach requires some relatively expensive optical components (single wavelength optical reflectors) and typically increases the noise figure of the amplifier.

In view of the above facts and reasons and the shortcomings of prior art approaches, it is clear that it would be highly desirable to provide multi-wavelength optical fiber communication systems that are substantially free of the described shortcomings, and that achieve this at moderate cost and with little or no added complexity. Furthermore, there is in general a need for optical fiber amplifiers having low multi-channel gain variation, low gain cross saturation and a low multi-channel gain tilt. This application discloses such systems and such optical fiber amplifiers.

SUMMARY OF THE INVENTION

In a broad aspect the invention is embodied in a multi-wavelength optical fiber communication system that is substantially free of the above discussed channel addition/removal-problems.

The optical fiber amplifiers in prior art systems typically are optimized for maximum gain or maximum output power, given an available pump power. In these cases, at least 50% of the pump power is generally absorbed in a given amplifier. On the other hand, amplifiers in multi-wavelength systems according to our invention are robust against input power transients and steady state changes. This is achieved with amplifiers wherein a significant fraction (>70%, preferably >90%) of the pump power is unabsorbed in a given amplifier. Such amplifiers will be referred to as "overpumped".

More specifically, the invention is embodied in a multi-wavelength optical fiber communication system comprising a transmitter, a receiver and a transmission path that signal-transmissively connects the transmitter and the receiver. The transmission path comprises an optical amplifier comprising a rare earth-doped optical amplifier fiber. The communication system also comprises a source of pump radiation and means for introducing the pump radiation into the fiber transmission path such that the pump radiation is provided to the optical amplifier fiber.

Significantly, the system is selected such that, after passage of the pump radiation through said amplifier fiber, at least 70% of the provided pump radiation power is unabsorbed by the optical amplifier fiber.

Sources of pump radiation suitable for use in embodiments of the invention are available, and can be expected to be mass produced in the future, resulting in relatively low cost. An exemplary source comprises a commercially available array of laser diodes emitting at 915 nm, the optical power coupled into dual-clad fiber and transformed into radiation of approximate wavelength 1480 nm by means of cascaded Raman lasers.

We have discovered that by overpumping the amplifier such that the above-recited conditions are met, it can be avoided that input power changes (due, for instance, to channel addition or removal) unduly affect the previous or remaining channels. Thus, the above discussed shortcoming can be substantially eliminated by overpumping of the optical fiber amplifier. The unused pump power typically but not necessarily is provided to utilization means, e.g., another amplifier.

DETAILED DESCRIPTION

Figure 1:
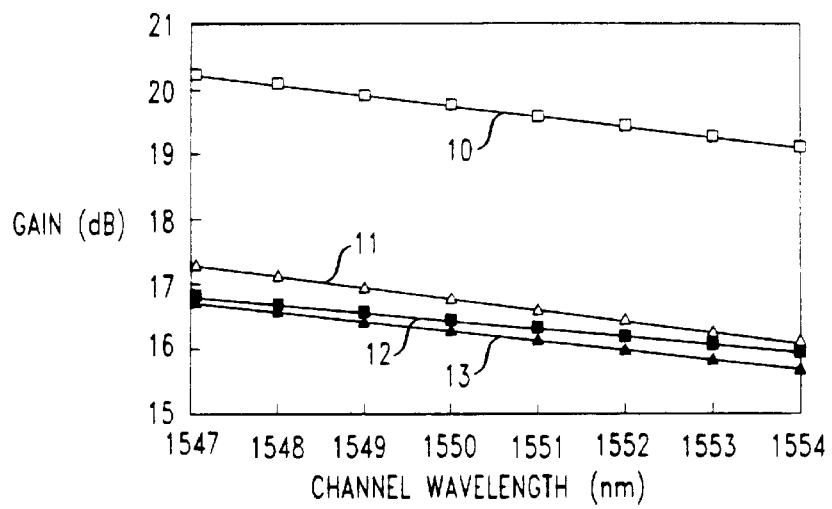
FIGS. 1–4 show exemplary performance data of optical fiber amplifiers according to the invention, and of analogous conventional amplifiers.

In rare earth (RE) doped optical fiber amplifiers the pump radiation serves to raise the dopant atoms to an excited energy state such that population inversion is attained. This is well known and does not require detailed explanation. An exemplary RE-doped optical fiber amplifier is an Er-doped fiber amplifier (EDFA).

The average inversion (<N>) along a RE-doped fiber of length L determines the gain G (in dB) at every wavelength (λ) through the following equation:

$$G(\lambda) = L[(\alpha + g^*)<N> - (\alpha + \delta)] \quad \text{(1)}$$

where α is the absorption coefficient in dB/m, g* the emission coefficient in dB/m, and δ the background loss in dB/m. As is well known to those skilled in the art, $\alpha(\lambda)$, $g^*(\lambda)$, $\delta(\lambda)$ and the so-called "saturation parameter" are the so-called "Giles parameters" that characterize a RE-doped fiber amplifier.

Equation 1 implies that, if the average inversion is kept constant, the spectral gain profile is fixed. This in turn implies that, if input power changes caused, for instance, by channel addition or removal can not influence the average inversion, then the previous or remaining channels keep their original gain, and error events in the channels are avoided.

In practice, a designer of a system according to the invention will generally select an amplifier configuration in which the pump power is such that, as a response to a specified channel addition/removal or other signal power change, the average inversion <N> is constant to a level such that the gain of no channel changes by more than some (desirably small) fraction. This is accomplished by providing an amount of pump power that leads to (nearly) identical inversion levels for two specified operating conditions.

By way of example, the two specified operating conditions are: (1) the input power levels of all channels are set to the minimum allowed level; and (2) the input power levels of all channels are set to the maximum allowed level. Herein the input power is considered to consist of the power of all channels plus amplified spontaneous emission (ASE).

Those skilled in the art will appreciate that other limiting operating conditions could also be used, if desired. For instance, the conditions could be that (1) N channels are active (all at a given power level); and (2), n channels are dropped from N channels (all at the given power level). Practice of the invention does not depend in principle on the choice of the limiting operating conditions, and all such conditions are contemplated. It will be understood, however, that the required amount of pump power will in general depend on the limiting conditions and on the acceptable gain variation.

The minimum unabsorbed pump power specified herein (namely, 70%) is considered to apply to substantially all reasonable limiting conditions, with lower percentage of unabsorbed pump power generally providing insufficient improvement in amplifier characteristics to be useful. In preferred embodiments the unabsorbed pump power typically will be 90% or more of the input pump power, which typically will be more than 50 mW.

Next we will illustrate the invention by specific examples. The first example assumes an EDFA with 10 m of Er-doped amplifier fiber, with a single co-propagating 980 nm pump providing 200 mW power in the fiber. The channel set is assumed to consist of eight wavelengths, from 1547 nm to 1554 nm, with 1 nm spacing between neighboring channels. Each channel is assumed to have maximum input power of −15 dBm and a minimum input power of −30 dBm. The limiting operating conditions are as discussed above, namely, all channels at −30 dBm and at −15 dBm, respectively. The results below were obtained by numerical modeling of the amplifier, using the Giles parameters.

FIG. 1 shows the channel gain as a function of wavelength for an amplifier according to the invention and for an amplifier designed to deliver the same gain at 1547 nm for −15 dBm input power/channel. The latter will be referred to as the "conventional" amplifier. The data points on the lines designated 10 and 12 were obtained for the conventional amplifier, and those on the lines designated 11 and 13 were obtained for the amplifier according to the invention. Lines 10 and 11 refer to −30 dBm input power/channel, and lines 12 and 13 refer to −15 dBm/channel.

As can be readily seen from FIG. 1, the conventional amplifier has a gain that depends significantly on the input power, whereas the amplifier according to the invention has a gain that depends only weakly thereon. Specifically, dropping the power levels from −15 dBm to −30 dBm/channel causes a gain increase of more than 3 dB for the former amplifier, but causes a mere 0.5 dB increase for the latter.

Figure 2:
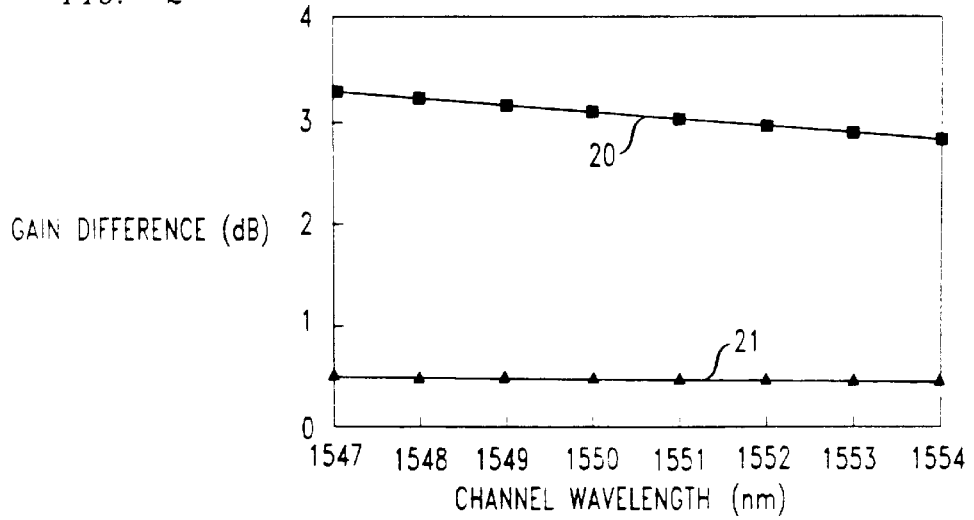

FIG. 2 shows the difference in channel gain for −15 dBm input power/channel and −30 dBm input power/channel. Line 20 pertains to the conventional amplifier and 21 to the amplifier according to the invention. As can readily be seen, the gain difference variation over the eight channels is 0.4 dB for the former and a mere 0.05 dB for the latter.

The next three examples illustrate the invention with different limiting operating conditions, namely, operation of all eight channels at −10 dBm input power, and dropping channels 3–8, respectively.

In the first of these examples, the pump wavelength was 980 nm. The amplifier according to the invention had a fiber length of 10 m and 200 mW pump power, and the conventional amplifier had a fiber length of 22 m and 55 mW pump power, selected to yield, when all channels are present, the same gain for the 1547 nm channel as the amplifier according to the invention.

Figure 3:
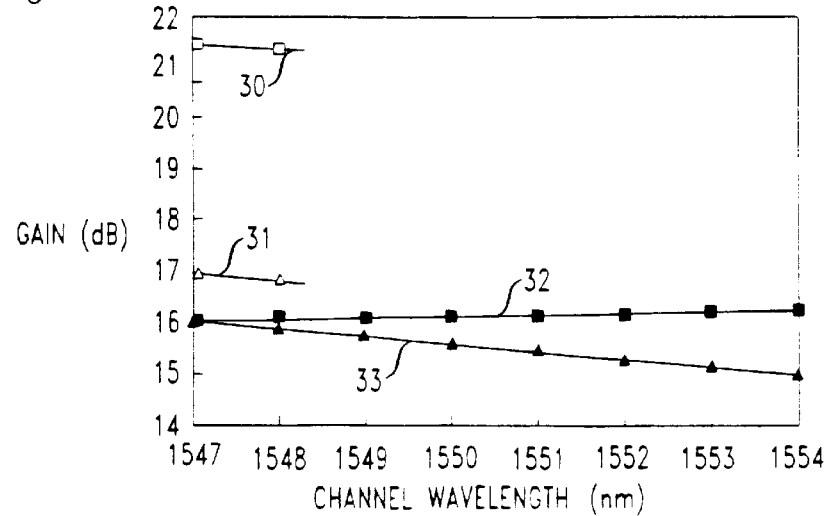

FIG. 3 shows channel gain, with lines 32 and 33 pertaining to the limiting operating condition of all eight channels being present, for the conventional amplifier and the amplifier according to the invention, respectively. Lines 30 and 31 pertain to the other limiting operating condition, namely, channels 3–8 dropped, for the conventional amplifier and the amplifier according to the invention, respectively. The latter amplifier has respectively 76% and 89% unabsorbed pump power, and the former amplifier has respectively 3% and 7% unabsorbed pump power.

As can be readily seen from FIG. 3, the gain of the amplifier according to the invention changes relatively little (about 1 dB) when six of eight channels are dropped, whereas the gain of the conventional amplifier changes considerably (about 6 dB) under the same conditions.

Figure 4:
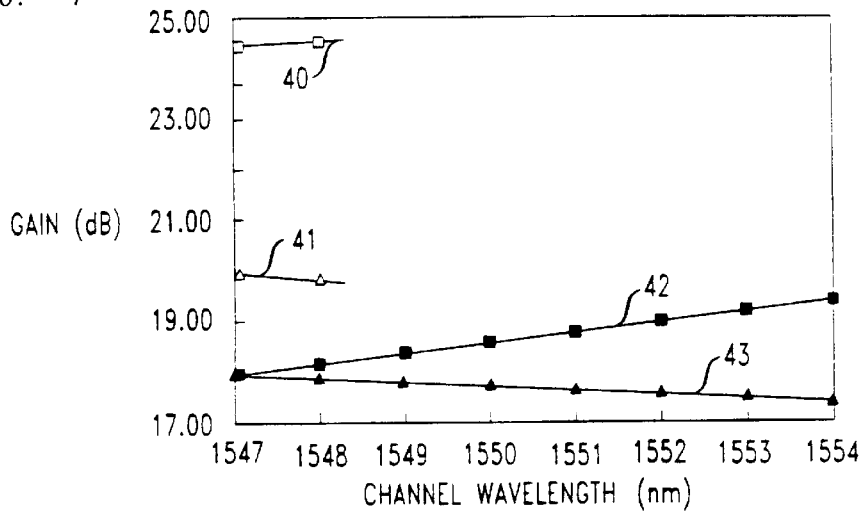

The next example uses the same limiting operating conditions, but pertains to 1480 nm pump wavelength. The amplifier according to the invention has 20 m fiber length, with 200 mW pump power, and the conventional amplifier has 44 m fiber length, with 74 mW pump power, the latter conditions again selected to provide the 1547 nm channel with equal gain for both amplifiers when all channels are present. The gain of the amplifiers is shown in FIG. 4, whereas lines 42 and 43 show the gain for all eight channels present, and lines 40 and 41 show the gain when six of the eight channels are dropped. Lines 40 and 42 pertain to the conventional amplifier, and lines 41 and 43 pertain to the amplifier according to the invention.

FIG. 4 shows again a much smaller (less than 2 dB) gain change for the amplifier according to the invention than for the conventional amplifier (more than 6 dB). In the former amplifier, respectively 73% and 88% of the pump power were not absorbed in the amplifier, with the corresponding percentages for the conventional amplifier being 4% and 9%.

Figure 5:
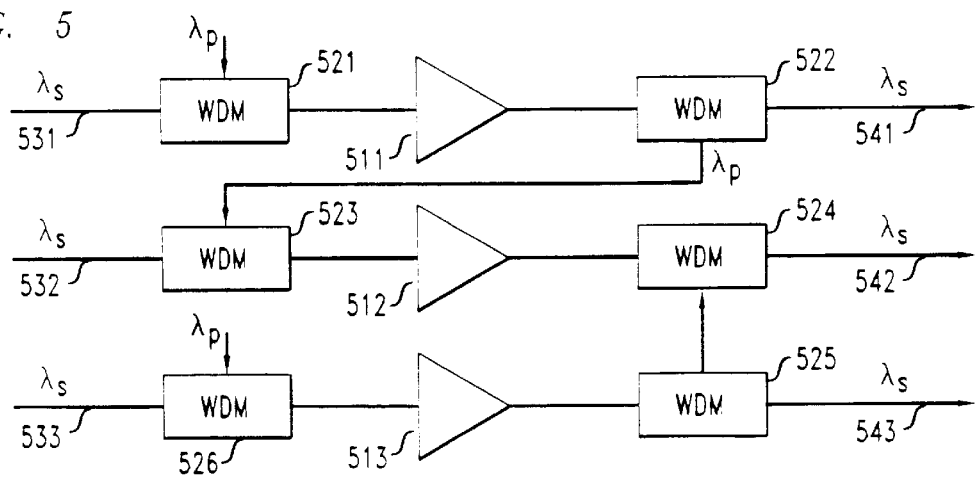
FIG. 5 schematically depicts an exemplary combination of amplifiers according to the invention.

FIG. 5 schematically shows a 3-amplifier combination according to the invention, wherein numerals 511–513 refer to EDFAs, numerals 521–526 refer to conventional wavelength-dependent couplers (frequently referred to as "WDM"), numerals 531–533 refer to input fibers, numerals 541–543 refer to output fibers and "$\lambda_s$" and "$\lambda_p$" refer to signal radiation and pump radiation, respectively. Optical isolators will typically be utilized but are not shown. The signal radiation is again assumed to support 8 channels, evenly spaced from 1547 nm to 1554 nm, inclusive. As will be recognized from FIG. 5, amplifiers 511 and 513 are "co-pumped", whereas amplifier 512 is co- and counter-pumped with the unused pump radiation of the former two amplifiers. All three EDFAs have 20 m fiber length, and the pump radiation wavelength is 1480 nm. The limiting operating conditions are as before, namely, all eight channels at −10 dBm, and channels 3–8 dropped, respectively. Amplifiers 511 and 513 each receive 200 mW pump radiation, and amplifier 512 receives 115 mW of co-propagating and 115 mW of counter-propagating pump radiation.

Dropping channels 3–8 results in a gain increase of about 1.65 dB in each of the two remaining channels of EDFAs 511 and 513, and in an increase of about 1.5 dB in EDFA 512. The percentage unused pump power in EDFAs 511 and 513 is 73% and 88%, respectively, and is 75% and 89%, respectively, in EDFA 512. The smaller percentage value of unused pump power applies when all eight channels are active. As can be deduced from the above description, the combination of optical amplifiers is relatively insensitive to changes in the number of active channels.

The above results were obtained assuming, for calculational reasons, the presence of isolators between WDMs 522 and 523, and 525 and 524, respectively. In practice this will frequently not be necessary, and a system without these isolators is expected to have improved performance, as compared to the modeled system.

Figure 6:
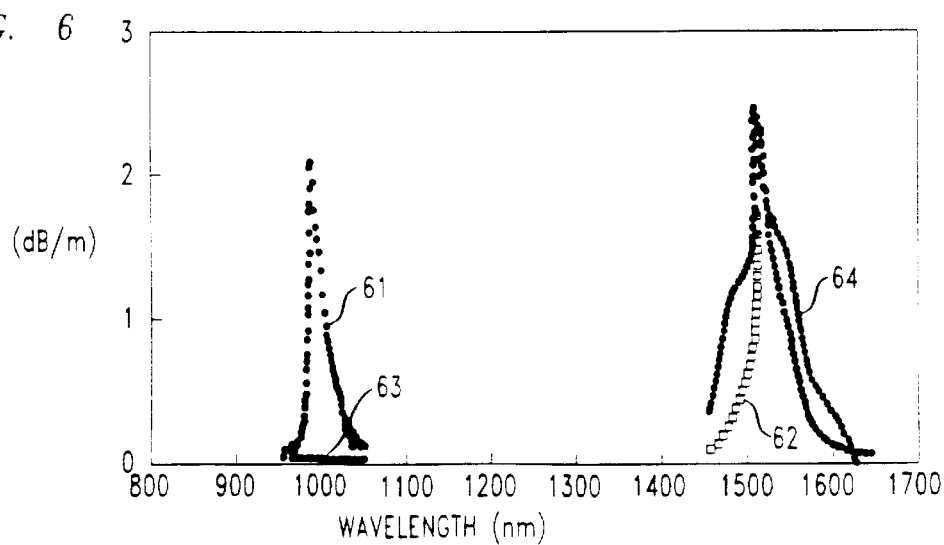
FIG. 6 shows the absorption coefficient and emission coefficient of the Er-doped fiber used in the examples.

FIG. 6 shows two of the Giles parameters for the Er-doped fiber that was used in the calculations that resulted in the above-recited data. Numerals 61 and 62 refer to $\alpha(\lambda)$, and numerals 63 and 64 refer to $g^*(\lambda)$. The background loss was assumed to be 0.004 dB/m, and the saturation parameter was assumed to be $1.05 \times 10^{15}$ m$^{-1}$s$^{-1}$. As those skilled in the art know, the Giles parameters characterize the amplifier fiber and are conventionally used in optical fiber amplifier modeling and design.

Figure 7:
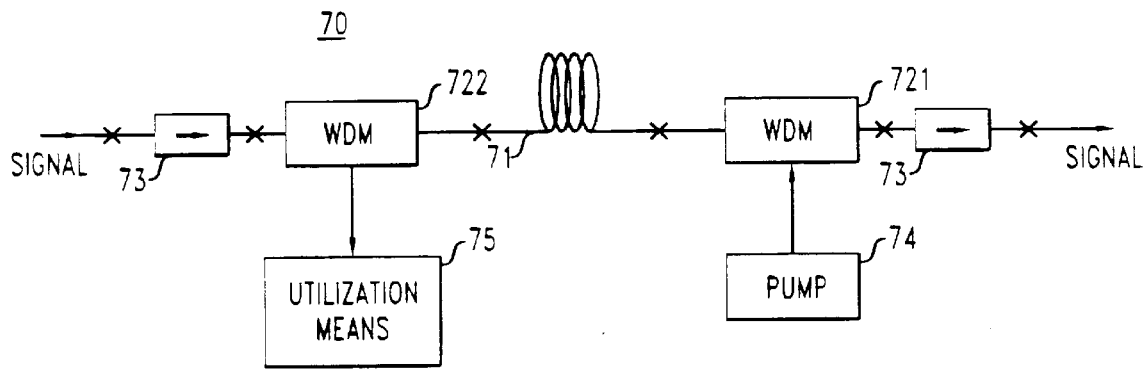
FIG. 7 shows an exemplary optical fiber amplifier according to the invention.

FIG. 7 schematically shows an exemplary optical amplifier 70 according to the invention. Numeral 71 refers to the RE-doped (exemplarily Er-doped) optical fiber of appropriate characteristics and length, numerals 721 and 722 refer to conventional couplers (WDMs), and numeral 73 refers to conventional isolators. Numeral 74 refers to an appropriate pump source, and numeral 75 refers to (optional) utilization means for the unabsorbed pump radiation, exemplarily a further optical amplifier. The "x" indicate splices, as is conventional.

Figure 8:
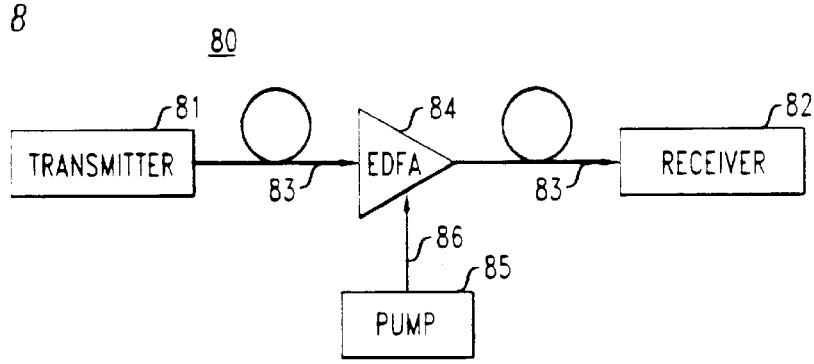
FIG. 8 schematically depicts an exemplary multi-wavelength optical fiber communication system according to the invention.

FIG. 8 schematically shows an optical fiber communication system 80 according to the invention, wherein numerals 81–86 refer to the multi-wavelength transmitter, multi-wavelength receiver, optical fiber transmission path, optical fiber amplifier, pump radiation source and means for coupling the pump radiation into the transmission path, respectively.

Figure 9:
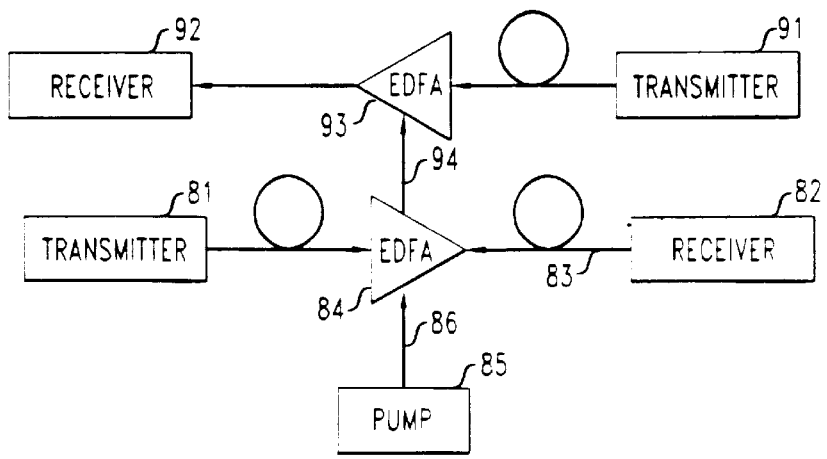
FIG. 9 schematically shows a further embodiment of the invention.

It will be understood that the invention can be embodied in a variety of further system configurations, and all such configurations are contemplated. For instance, the unused pump power can remain in the transmission path and provide Raman gain for the signal channels, or the unused pump power can be used to pump an optical fiber pre-amplifier, typically a pre-amplifier for signals traveling in a separate optical fiber transmission path in the opposite direction, as is schematically shown in FIG. 9, wherein numerals 91 and 92 refer to the transmitter and receiver of the oppositely directed fiber system, 93 refers to a EDFA, exemplarily a preamplifier, and 94 refers to means for providing the unused pump radiation of EDFA 84 to EDFA 94.

More generally, the unused pump power can be used to pump another EDFA, not necessarily in the same optical fiber transmission path. The optical amplifiers can be single stage amplifiers or multistage amplifiers. In the latter case it will typically be the output stage that is overpumped according to the invention. Utilization of the unused pump power is optional, and elimination of the unused pump beam (e.g., by directing it into an absorbing medium) is contemplated.

The invention claimed is:

1. An optical fiber communication system comprising a transmitter, a receiver and a transmission path signal-transmissively connecting the transmitter and the receiver, wherein a) the optical fiber communication system is a multi-channel optical fiber communication system adapted for transmission of signal radiation at wavelengths $\lambda_1$, $\lambda_2$, ... $\lambda_N$, where $N \leq 2$, with n being the number of active channels, where $n \geq N$;

b) the transmission path comprises a length of rare earth doped optical amplifier fiber spaced from said transmitter and said receiver;

c) the optical fiber communication system further comprises a source of pump radiation and a coupler for coupling the pump radiation into the transmission path such that pump radiation is provided to the optical amplifier fiber;

CHARACTERIZED IN THAT d) the optical fiber communication system is selected such that, after passage of the pump radiation through said length of optical amplifier fiber, at least 90% of the provided pump radiation is unabsorbed in said optical amplifier fiber, such that a gain difference variation over said active channels is substantially the same for all said active channels, as the number of active channels n is varied.

2. System according to claim 1, wherein the optical fiber communication system further comprises utilization means for the unabsorbed pump radiation power.

3. System according to claim 2, wherein said utilization means comprise a further optical fiber amplifier.

4. System according to claim 3, wherein the further optical amplifier is a rare earth-doped optical fiber amplifier.

5. System according to claim 4, wherein the rare earth-doped optical fiber amplifier is a preamplifier for signal radiation in a further optical fiber transmission path.

6. System according to claim 1, wherein the optical fiber amplifier is a multistage optical fiber amplifier.

7. System according to claim 3, wherein the utilization means comprise a distributed Raman amplifier.

8. System according to claim 1, wherein the transmission path comprises two or more lengths of rare earth-doped optical amplifier fiber.

9. System according to claim 1, wherein said gain difference variation over said active channels is about 0.05 dB for all said active channels, as n is varied.

* * * * *

UNITED STATES PATENT AND TRADEMARK OFFICE
CERTIFICATE OF CORRECTION

PATENT NO. : 6,043,928
DATED : March 28, 2000
INVENTOR(S) : Kenneth Lee Walker, Frederik Willem Willems It is certified that error appears in the above-identified patent and that said Letters Patent is hereby corrected as shown below:

<u>Column 6,</u>
Line 27, change "$N \leqq 2$" to -- $N \geqq 2$ --.

Line 28, change "$n \geqq N$" to -- $n < N$ --.

Signed and Sealed this

Sixteenth Day of July, 2002

Attest:

JAMES E. ROGAN
Attesting Officer     Director of the United States Patent and Trademark Office